(12) United States Patent
May

(10) Patent No.: US 7,357,887 B2
(45) Date of Patent: Apr. 15, 2008

(54) IDENTIFIABLE STRUCTURES AND SYSTEMS AND METHODS FOR FORMING THE SAME IN A SOLID FREEFORM FABRICATION SYSTEM

(75) Inventor: Gregory J. May, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 29 days.

(21) Appl. No.: 10/820,409

(22) Filed: Apr. 8, 2004

(65) Prior Publication Data

US 2005/0225004 A1 Oct. 13, 2005

(51) Int. Cl.
*D04H 1/16* (2006.01)
*B32B 7/00* (2006.01)

(52) U.S. Cl. .................. 264/113; 264/112; 264/308; 264/255; 264/132; 156/62.2

(58) Field of Classification Search ........... 264/171.27, 264/172.13
See application file for complete search history.

(56) References Cited

U.S. PATENT DOCUMENTS

| | | | |
|---|---|---|---|
| 4,605,847 A | 8/1986 | Schittko et al. | |
| 4,625,100 A | 11/1986 | Smith | |
| 4,701,942 A | 10/1987 | Ott | |
| 5,044,955 A * | 9/1991 | Jagmin | 433/229 |
| 5,071,503 A * | 12/1991 | Berman | 156/250 |
| 5,263,130 A | 11/1993 | Pomerantz et al. | |
| 5,779,833 A * | 7/1998 | Cawley et al. | 156/89.11 |
| 5,830,529 A * | 11/1998 | Ross | 427/152 |
| 6,045,734 A * | 4/2000 | Luther et al. | 264/103 |
| 6,133,336 A | 10/2000 | Popat et al. | |
| 6,376,148 B1 | 4/2002 | Liu et al. | |
| 6,540,784 B2 | 4/2003 | Barlow et al. | |
| 6,547,994 B1 * | 4/2003 | Monkhouse et al. | 264/40.1 |
| 6,676,987 B2 * | 1/2004 | Zhong et al. | 427/2.24 |
| 7,086,863 B2 * | 8/2006 | Van der Zel | 433/223 |
| 2001/0035597 A1 | 11/2001 | Grigg et al. | |
| 2002/0096112 A1 | 7/2002 | Coe | |
| 2003/0042641 A1 | 3/2003 | Abe et al. | |
| 2003/0086535 A1 | 5/2003 | Teppaz et al. | |
| 2003/0162150 A1 | 8/2003 | Engelbrecht et al. | |
| 2004/0026163 A1 | 2/2004 | Widmer et al. | |

FOREIGN PATENT DOCUMENTS

| | | |
|---|---|---|
| EP | 1 134 069 A1 | 9/2001 |
| WO | WO02/085241 | * 10/2002 |

* cited by examiner

*Primary Examiner*—Christina Johnson
*Assistant Examiner*—Jeff Wollschlager

(57) ABSTRACT

Method and systems for producing three-dimensional objects. One exemplary method, among others, includes: forming an identifiable structure within the three-dimensional object. The identifiable structure within the three-dimensional object can be detected using a non-invasive dimensional imaging device.

9 Claims, 3 Drawing Sheets

C-C

A-A

A-A

A-A

A-A

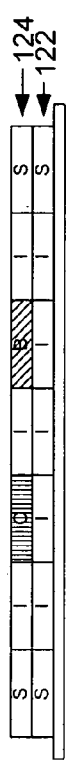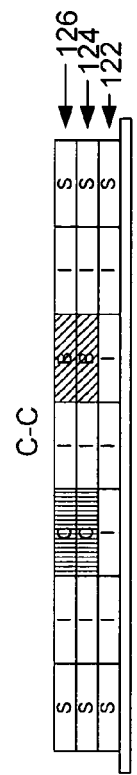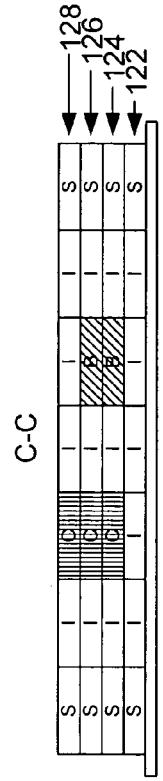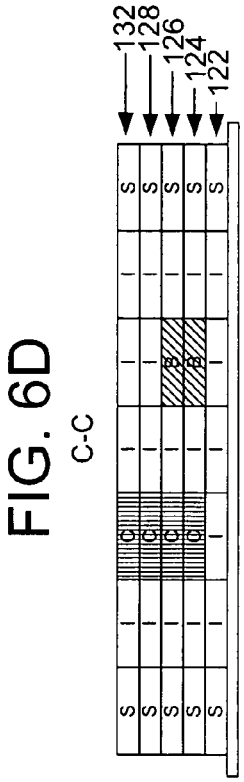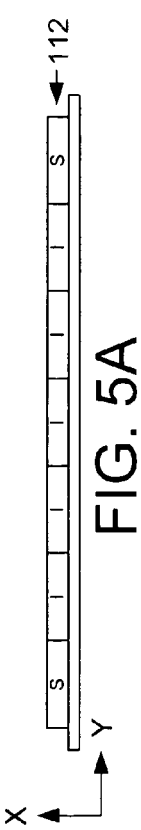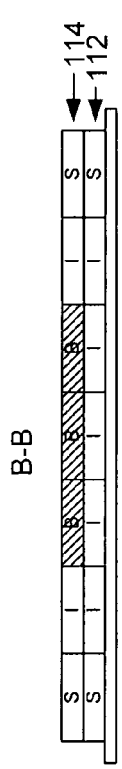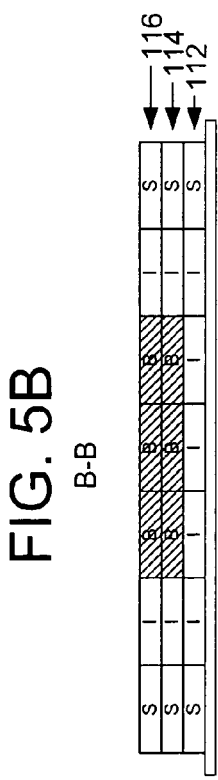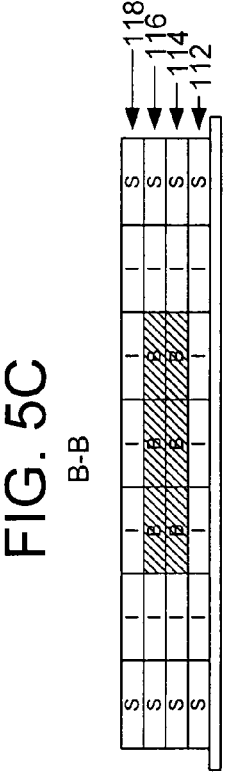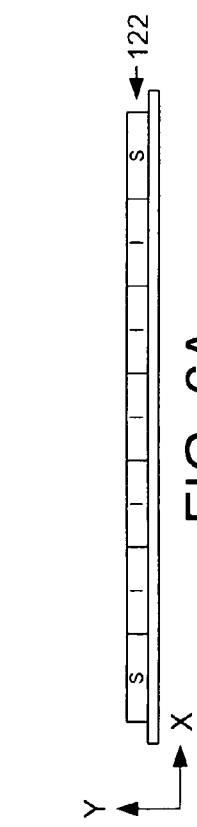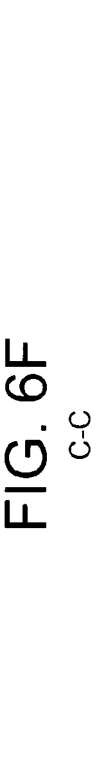

IDENTIFIABLE STRUCTURES AND SYSTEMS AND METHODS FOR FORMING THE SAME IN A SOLID FREEFORM FABRICATION SYSTEM

BACKGROUND

Solid freeform fabrication (SFF) or layered manufacturing (LM) is a fabrication technology that builds an object of any complex shape layer by layer or point by point without using a pre-shaped tool (die or mold). This process begins with creating a Computer Aided Design (CAD) file to represent the geometry of a desired object. SFF technology enables direct translation of the CAD image data into a three-dimensional object. SFF technology can be used in applications such as verifying CAD database, evaluating design feasibility, testing part functionality, assessing aesthetics, checking ergonomics of design, aiding in tool and fixture design, creating conceptual models and sales/marketing tools, generating patterns for investment casting, reducing or eliminating engineering changes in production, and providing small production runs.

Several principal forms of solid freeform fabrication involve a liquid ejection process. These techniques involve adding or depositing a build composition to form predetermined areas of a layer in a point-by-point manner. Predetermined areas can also be formed using a multiplicity of points that may be deposited at the same time (e.g., ink-jet technology). These predetermined areas together constitute a thin section of a three-dimensional object as defined by a CAD geometry. Successive layers are then deposited in a predetermined sequence with a layer being affixed to its adjacent layers forming an integral three dimensional, multilayer object.

SUMMARY

Briefly described, embodiments of this disclosure include method and systems for producing three-dimensional objects. One exemplary method, among others, includes: forming an identifiable structure within the three-dimensional object, wherein the identifiable structure within the three-dimensional object can be detected using a non-invasive dimensional imaging device.

Systems of producing a three-dimensional object are also provided. One exemplary method, among others, includes: a dispensing system including a build material and a contrast enhancing material and a a layer forming system. The layer forming system is operative to: form an identifiable structure, wherein the identifiable structure is fabricated from the contrast enhancing material, wherein the identifiable structure can be detected using a non-invasive dimensional imaging device, and form the three-dimensional object, wherein the identifiable structure is disposed within the three-dimensional structure.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

FIGS. 5A through 5D are side views of representative diagrams for an embodiment of the method of forming one of the identifiable structures in the three-dimensional object in FIG. 3 through the B-B cross-section.

FIGS. 6A through 6F are side views of representative diagrams for an embodiment of the method of forming one of the identifiable structures in the three-dimensional object in FIG. 3 through the C-C cross-section.

DETAILED DESCRIPTION

Figure 2:
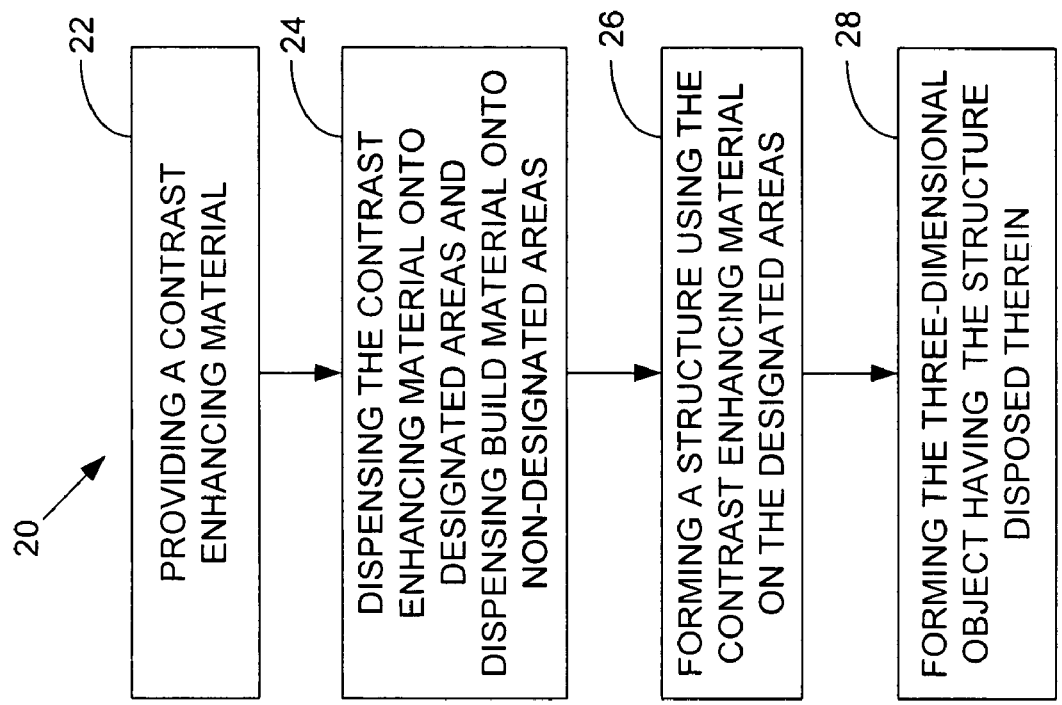
FIG. 2 is a representative flow diagram for an embodiment of a method of forming a three-dimensional object having an identifiable structure disposed therein using the SFF system of FIG. 1.

Identifiable structures and systems and methods for fabricating the identifiable structure are provided. Embodiments of this disclosure relate to the three-dimensional objects and fabrication thereof, where one or more identifiable structures are disposed within and/or on the surface of three-dimensional objects. In particular, the three-dimensional object including the identifiable structure can be fabricated using solid freeform fabrication (SFF) systems and methods. The term "three-dimensional object" refers to objects that are sufficiently rigid to maintain a fixed volume and shape to an extent, which is appropriate for use in SFF systems. The term "identifiable structure" refers to a structure that can be identified using noninvasive dimensional penetrating imaging devices or exploratory devices. In addition, the identifiable structure is fabricated so that it provides information (e.g., identifying, quantitative, and/or qualitative information) about the three-dimensional object that can be detected using noninvasive dimensional penetrating devices. Additional details regarding the three-dimensional object and the identifiable structure are described in more detail below.

In general, the identifiable structure is disposed within and/or upon the surface of the three-dimensional object to provide information that would otherwise be difficult or impossible to convey, determine, or detect without invasive action and/or harming action to the three-dimensional object and/or the subject (e.g., animal, human, etc.) that the three-dimensional object is disposed within. For example, a bone replacement can be fabricated to include an identifiable structure disposed therein. The identifiable structure can be detected using a noninvasive X-ray technique, for example. For example, the identifiable structure can represent a bar code and/or letters, numbers, symbols, etc., that can be read off of the X-ray and used to identify features (e.g., date created, manufacturer, etc.) of the bone replacement. In addition or alternatively, the identifiable structure can include dimensional, orientation, and/or alignment features that could be useful for evaluating the bone replacement without invasive surgery. Currently, bone identification information can only be accessed using invasive surgery.

In some embodiments the identifiable structure is disposed within the three-dimensional object. By including the identifiable structure within the three-dimensional object, the material that the identifiable structure is constructed of does not have to be compatible with the material (e.g., body fluids, tissue, etc.) located on the exterior of the three-dimensional object, thereby protecting the information contained in the identifiable structure from harmful environments and/or protecting the material on the exterior of the three-dimensional object from the identifiable structure.

In another embodiment the identifiable structure is disposed within a security device such as a key card. The identifiable structure can be made of a magnetic material, for example, that the can be identified by the noninvasive dimensional penetrating device or detecting device. For example, the identifiable structure can be designed (e.g., shaped) so that the identifiable structure is distinguishable from other key cards.

The three-dimensional structure can include, but is not limited to, bone replacements (e.g., joint replacements), dental structures (e.g., dental caps), a portion of a medical device disposed within the body of a subject, and a security item (e.g., located within a security key or card, within a credit card, or some other security device).

The identifiable structure can include one or more structures that provide information about the three dimensional object such as, but not limited to, one or more structures that define a code (e.g., bar code), one or more structures that define a signature or identification marking (e.g., words, letters, symbols that identify a manufacturer, a date of creation, a part identification, a reference mark, a unique shape, and a pattern), one or more structures that define the orientation of the three-dimensional object with respect to itself or another object, one or more structures that define alignment features of the three-dimensional object with respect to itself or another object, one or more structures that define the dimensional relationship (e.g., distance in the x-, y-, and/or z-axis) of the three-dimensional object with respect to itself or another object, one or more structures that define textures (shading) within the three-dimensional object, one or more optical structures that after being embedded within the three-dimensional structure can be identified using the noninvasive dimensional penetrating imaging device, one or more structures (e.g., adjacent one another or one structure embedded with another structure) made of different materials and identified using the same or different noninvasive dimensional penetrating imaging devices, one or more structures that define a symbol, icon, emblem, logo, sign, etc, that identifies or otherwise indicates information about the three-dimensional object or a relationship between the three-dimensional object and another object, and combinations thereof.

The identifiable structure can include a structure made from one or more contrast enhancing materials dispensed into an area and viewable with the noninvasive dimensional penetrating imaging device. In addition, the identifiable structure can include a structure having a void or cavity within the structure, where the void or cavity (e.g., an air-gap) defines one or more structures communicating the information as described above. In one embodiment, the contrast between the contrast enhancing material and/or the build material, and the air-gap can be viewed by the noninvasive dimensional penetrating imaging device. Initially, the void can be filled with a material (e.g., a polymer) that can be caused to substantially decompose thereby forming the void. In another embodiment, the void can be filled with a second contrast enhancing agent or other material (e.g., build material) that can be contrasted with the contrasting material and viewed using the noninvasive dimensional penetrating imaging device.

The identifiable structure can be one dimensional or multidimensional. The dimensions (e.g., thickness, length, and width) of the identifiable structure can be from a few nanometers to many micrometers limited by the resolution of the imaging technology/machine and the size of the three-dimensional object, for example. In addition, the dimensions of the identifiable structure depend, at least in part, upon the contrast enhancing material being used, the material surrounding the identifiable structure, the noninvasive dimensional penetrating imaging device, the technique used to make the identifiable structure, and the information conveyed using the identifiable structure.

Figure 1:
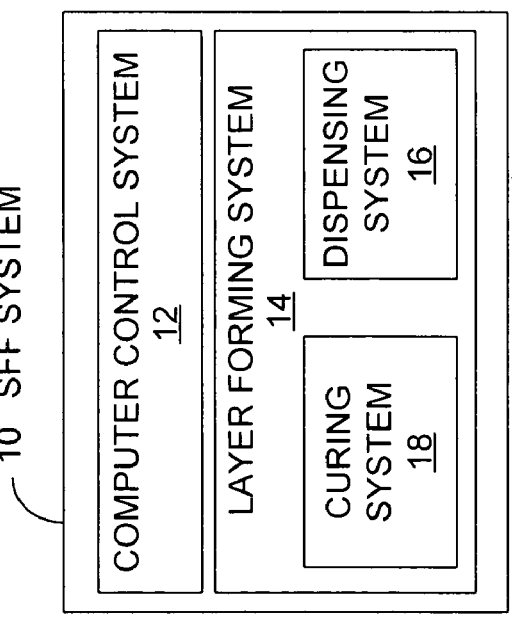
FIG. 1 illustrates an embodiment of a solid freeform fabrication (SFF) system.

FIG. 1 illustrates a block diagram of a representative SFF system 10 that includes a computer control system 12 and a layer forming system 14. The layer forming system 14 includes, but is not limited to, a dispensing system 16 and a curing system 18. The curing system 18 can include a conventional curing system (e.g., an ultraviolet or visible radiation curing system). The computer control system 12 includes a process control system that is operative to control the dispensing system 16 and the curing system 18. In addition, the computer control system 12 includes, but is not limited to, a Computer Aided Design (CAD) system or other SSF CAD-related systems.

The dispensing system 16 includes, but is not limited to, conventional ink-jet technologies, conventional coating technologies, and future ink-jet/coating technologies, which dispense a build material or precursor components thereof that form the three-dimensional object. In addition, the dispensing system is adapted to dispense the contrast enhancing material or precursor components into defined portions to form the identifiable structure. It should be noted that the build material or precursor components thereof and contrast enhancing material or precursor components could be dispensed sequentially or at the same time from the same or different dispensing heads.

Ink-jet technology, such as drop-on-demand and continuous flow ink-jet technologies, can be used to dispense build material, contrast enhancing materials, or precursor components of each onto a build platform and layers of material formed thereon. The dispensing system 16 can include at least one conventional ink-jet printhead (e.g., thermal ink-jet printhead and/or a piezo ink-jet print head) operative to dispense (e.g., jet) the build material, contrast enhancing materials, or precursor components of each through one or more of a plurality of ink-jet printhead dispensers. Alternatively, the build material, contrast enhancing materials, or precursor components of each could be disposed onto one or more layers of the build material using other automated or manual techniques.

The build material can include one or more components known in the art such as, but not limited to, build materials, initiators, colorants (e.g., dyes, pigments, inks), and dispersants.

In addition, the dispensing system 16 can include a contrast enhancing material. The contrast enhancing material can include materials that can be detected using noninvasive dimensional penetrating devices such as, but not limited to, X-ray devices, magnetic imaging devices, computerized axial tomography (CAT) scan devices, ultrasound devices, and computerized topography devices.

The contrast enhancing material can include, but is not limited to, metal containing compounds, metal and/or metal composite micro- and/or nano-particles, and combinations thereof. In particular, the contrast enhancing material can include metal containing compounds such as, but not limited to, bismuth, silver, lead, iron (ferrous material), and combinations thereof. Further, the contrast enhancing material can include micro- and/or nano-particles of metals (e.g., silver, lead, and/or bismuth nano-particles), metal composites, and/or metal oxides. It should be noted that the micro- and/or nano-particles have diameters in the range so that the dispensing system does not become clogged while dispensing. In one embodiment the particle size can be about 10 to 20% of the orifice size. In another embodiment the particle size can be about 15 to 20% of the drop size. For example, with a 5 picoliter drop volume, the drop size is about 15-20 micrometers. This suggests a particle size 15 to 20% of that dimension. Another factor to consider is the solid loading, which for thermal inkjets is less than about 5% and for piezo inkjet drop content is less than about 15%. In addition, the micro- and/or nano-particles are suspended in a solution.

In addition, the contrast enhancing material can include, but is not limited to, a colorant (e.g., carbon black). The colorant can include, but is not limited to, optical dyes and pigments, and combinations thereof.

In another embodiment, the contrast enhancing material can include contrast media such as X-ray contrast media and magnetic resonance contrast media. X-ray contrast media are used to alter the contrast in X-rays (e.g., increase or decrease the attenuation of the X-rays). Positive X-ray contrast media increase the attenuation of the X-rays and can include, but are not limited to, iodinated contrast media and barium contrast media. Iodinated contrast media can include, but are not limited to, water insoluble iodinated media (e.g., propyliodone compounds), oily contrast media (e.g., lipiodol compounds and iodophenyllundecyclic compounds mixed in an oil), and water soluble iodinated media (e.g., mono-/poly-iodinated pyridone compounds and tri-iodinated benzene ring compounds (monomeric-/dimeric)).

Magnetic resonance contrast media can include positive and negative contrast media. Positive contrast magnetic resonance media can include small molecular weight compounds containing gadolinium (Gd), manganese (Mn), and iron (Fe), superparamagnetic contrast media, and perfluorinated contrast media. For example, the media can include, but is not limited to, gadopentate meglumine compounds, gadodiamide, gadoversetamide, ferric ammonium citrate, gadoxetic acid, diphenylcyclohexyl phosphodiester, manganese substituted hydroxylapatite PEG-APD and the like.

Negative contrast magnetic resonance media include, but are not limited to, sprodyamide, ferrum oxide, carboxydextran coated iron oxide nanoparticles, micro-/poly-crystalline iron oxide nanoparticles, perfluorooctylbromide, barium suspensions and clay mineral particles, and the like. In one embodiment, the particle size is less than about 300 nanometers. Additional compounds can be found at http://www.amershamhealth.com/medcyclopaedia.

In another embodiment, the contrast enhancing material could be part of and/or combined with the build material, binder material, and/or other components used to fabricate the three-dimensional object.

In another embodiment, two different contrast enhancing materials can be used, where the two contrast enhancing materials can be viewed using the same or different noninvasive dimensional penetrating imaging device. The two different contrast enhancing materials can be used to make one or more identifiable structures (e.g., adjacent or embedded within one another). For example, one identifiable structure can be embedded within another identifiable structure, where each identifiable structure is made of a different contrast enhancing material each of which can be viewed using different noninvasive dimensional penetrating imaging devices.

It should also be noted that the density or concentration of the contrast enhancing material in a designated area can be controlled by the number of passes of the dispensing system over the designated area (e.g., more passes over the designated area equals higher concentration in the designated area). It should also be noted that this can be done without performing a planing pass and amounts to performing multiple passes to build up the concentration.

The SFF system 10 can be incorporated into processes that are used to fabricate or construct three-dimensional objects having identifiable structures disposed therein, in an iterative layered process on a support (e.g., a structure used to support a region of the three-dimensional object while it is being fabricated). The computer control system 12 is capable of being selectively adjusted to control the output from the dispensing system 16, which controls the thickness and pattern of each component in each layer of the iterative process. Additional details regarding the layers of the three-dimensional object are discussed below.

The SFF system 10 can include a planing system that uses a planing device to normalizes the height of one or more of the layers of the three-dimensional object after the layer is formed. The planing device (e.g., heated or unheated) normalize the height of the layers of materials to a predetermined height or thickness. An example of a planing device includes a pre-heated rotating planarizer that passes over each layer after the layer has been formed. In particular, the pre-heated cylindrical roller (planarizer) is precisely passed over each layer and locally melts a portion of the build material and/or the contrast enhancing material of the layer. Some of the build material and/or the contrast enhancing material adheres to the surface of the planarizer as it rolls to thereby normalize the layer to conform to the desired thickness. A wiping or scraping device such as a blade can be used to peel or skive off the excess build material and/or the contrast enhancing material from the planarizer.

It should be noted that after planing the layers, the layer could be cured. In general, the layers can be cured by full exposure or by scan exposing. To enhance layer-to-layer adhesion, it may be useful to only partially cure each layer during the fabrication process. A full cure could be accomplished by placing the object in a light box after removal from the fabrication tool. In addition, the curing process can be performed after the layers are disposed on a build platform (e.g., flood exposure or scan exposure). Furthermore, the curing process can be performed in a substantially contemporaneous manner by scan exposing the build material and/or the contrast enhancing material as the material is dispensed.

FIG. 2 is a flow diagram describing a representative method 20 for forming a three-dimensional object having an identifiable structure disposed therein, using the SFF system 10. In block 22, the contrast enhancing material is provided. As mentioned above, the dispensing system 16 includes one or more containers to hold the contrast enhancing material as well as the build material.

In block 24, the contrast enhancing material is disposed in a layer-by-layer fashion onto the designated areas, which are defined by the dimensions of the identifiable structure, while the build material is disposed onto the remaining areas of the partially formed three-dimensional object. The computer control system 12 in conjunction with the layer forming system 14 controls the dispensing of the contrast enhancing material. As each layer of the contrast enhancing material and build material is disposed, each layer is planed. Alternatively, the planning can occur after a plurality of layers is formed.

In block 26, the plurality of layers of contrast enhancing material forms the identifiable structure. Subsequently, additional layers of build material are disposed to form the remaining portions of the three-dimensional object having the identifiable structure disposed therein, as shown in block 28.

Figure 3:
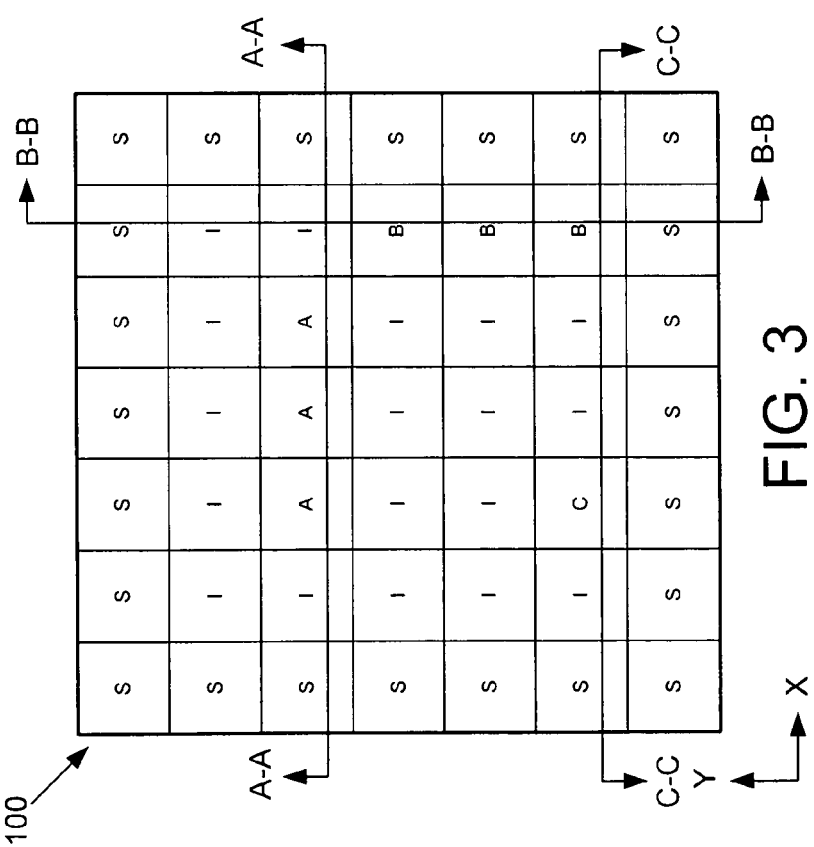
FIG. 3 is a top view of a representative embodiment of the three-dimensional structure including three identifiable structures that were fabricated using the embodiment of the SFF system of FIG. 1.

FIG. 3 illustrates a representative cross-section of a three-dimensional object 100 having three identifiable structures disposed thereon. Prior to forming the three-dimensional object 100, the layer forming system 14 divides the three-dimensional object 100 into a plurality of cross-sectional layers. Each layer can be further divided into shell voxels ("S") (e.g., an exterior layer and/or another layer disposed within the interior of the three-dimensional object), interior voxels ("I"), and identifiable structure voxels ("A" voxels, "B" voxels, and "C" voxels).

In general, the shell voxels and the interior voxels are made of the same material. However, the shell voxels and the interior voxels can be made of the same or different material. The distinction between shell voxel and interior voxel is the location on the each voxel, as illustrated in FIG. 3. The shell voxel is defined as an area within a certain distance in the x-, y-, and z-directions of transition between the voxel and air, and layer and support. In other words, the shell voxel represents the exterior side portions of the three-dimensional object 100. The identifiable structure voxels include discrete areas in the x-, y-, and/or z-directions of the three-dimensional object, while the interior voxels includes the remaining inside areas of the three-dimensional object 100. The identifiable structure layers form the identifiable structures represented by the "A's", "B's", and "C's".

Figure 4A:
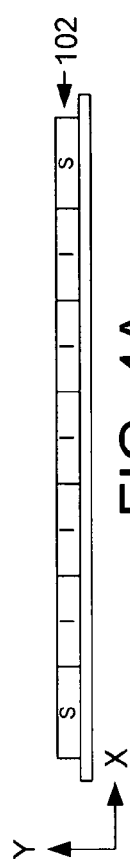
FIGS. 4A through 4D are side views of representative diagrams for an embodiment of a method of forming one of the identifiable structures in the three-dimensional object in FIG. 3 through the A-A cross-section.

FIG. 4A illustrates a cross-section of a base layer of a three-dimensional object 100 shown in FIG. 3 though the A-A cross-section. The base layer 102 is formed on a build platform and includes the shell voxels and the interior voxels. In some embodiments the base layer 102 can include a plurality of layers having various geometric cross-sections as defined by the three-dimensional object to be formed.

Figure 4B:
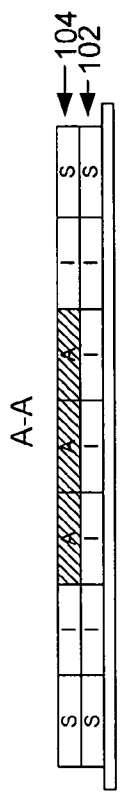

FIG. 4B illustrates a cross-section of the base layer 102 having a first layer 104 formed thereon. The first layer 102 includes shell voxels, interior voxels, and identifiable structure voxels "A". The identifiable structure voxels are formed in the x-plane, however the identifiable structure voxels could be formed in the y- and/or z-planes as well.

Figure 4C:
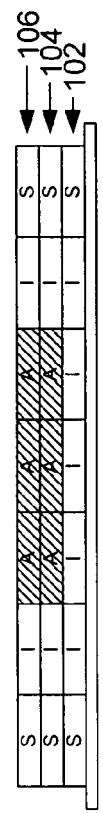

FIG. 4C illustrates a cross-section of the base layer 102 and the first layer 104, where a second layer 106 is formed on the first layer 104. The second layer 106 includes shell voxels, interior voxels, and second identifiable structure voxels "A". Although only two layers of identifiable voxels are dispensed to form the identifiable structure shown in FIG. 3, additional identifiable voxels can be dispensed to form the identifiable structure.

Figure 4D:
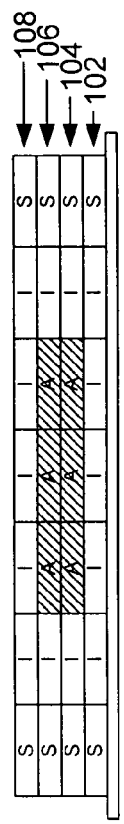

FIG. 4D illustrates a cross-section of the base layer 102, the first layer 104, and the second layer 106, where a third layer 108 is formed on the second layer 106. The third layer 108 includes shell voxels and interior voxels. In some embodiments the third layer 108 can include a plurality of layers that ultimately form the three-dimensional object 100.

FIG. 5A illustrates a cross-section of a base layer of a three-dimensional object 100 shown in FIG. 3 through the B-B cross-section. The base layer 112 is formed on a build platform and includes the shell voxels and the interior voxels. In some embodiments the base layer 112 can include a plurality of layers having various geometric cross-sections as defined by the three-dimensional object to be formed.

FIG. 5B illustrates a cross-section of the base layer 112 having a first layer 114 formed thereon. The first layer 112 includes shell voxels, interior voxels, and identifiable structure voxels "B". The identifiable structure voxels are formed in the y-plane, however the identifiable structure voxels could be formed in the x- and/or z-planes as well.

FIG. 5C illustrates a cross-section of the base layer 112 and the first layer 114, where a second layer 116 is formed on the first layer 114. The second layer 116 includes shell voxels, interior voxels, and second identifiable structure voxels "B".

FIG. 5D illustrates a cross-section of the base layer 112, the first layer 114, and the second layer 116, where a third layer 118 is formed on the second layer 116. The third layer 118 includes shell voxels and interior voxels. In some embodiments the third layer 118 can include a plurality of layers that ultimately form the three-dimensional object 100.

FIG. 6A illustrates a cross-section of a base layer of a three-dimensional object 100 shown in FIG. 3 though the C-C cross-section. The base layer 122 is formed on a build platform and includes the shell voxels and the interior voxels. In some embodiments the base layer 122 can include a plurality of layers having various geometric cross-sections as defined by the three-dimensional object to be formed.

FIG. 6B illustrates a cross-section of the base layer 122 having a first layer 124 formed thereon. The first layer 122 includes shell voxels, interior voxels, identifiable structure voxels "B", and identifiable structure voxels "C". The identifiable structure voxels "B" are formed in the y-plane, however the identifiable structure voxels could be formed in the x- and/or z-planes as well. The identifiable structure voxels "C" are formed in the x-plane, however the identifiable structure voxels could be formed in the y- and/or z-planes as well.

FIG. 6C illustrates a cross-section of the base layer 122 and the first layer 124, where a second layer 126 is formed on the first layer 124. The second layer 126 includes shell voxels, interior voxels, second identifiable structure voxels "B", and second identifiable structure voxels "C".

FIG. 6D illustrates a cross-section of the base layer 122, the first layer 124, and the second layer 126, where a third layer 128 is formed on the second layer 126. The third layer 128 includes shell voxels, interior voxels, and third identifiable structure voxels "C".

FIG. 6E illustrates a cross-section of the base layer 122, the first layer 124, the second layer 126, and the third layer 128, where a fourth layer 132 is formed on the third layer 128. The fourth layer 132 includes shell voxels, interior voxels, and fourth identifiable structure voxels "C".

FIG. 6F illustrates a cross-section of the base layer 122, the first layer 124, the second layer 126, the third layer 128, and the fourth layer 132, where a fifth layer 134 is formed on the fourth layer 132. The fifth layer 134 includes shell voxels and interior voxels. In some embodiments the fifth layer 134 can include a plurality of layers that ultimately form the three-dimensional object 100.

Many variations and modifications may be made to the above-described embodiments. All such modifications and variations are intended to be included herein within the scope of this disclosure and protected by the following claims.

At least the following is claimed:

1. A method of producing a three-dimensional object, comprising the steps:

disposing at least one layer of a first material onto a first area in an iterative manner using at least one ink-jet printhead, wherein the first material is selected from a build material and a contrast enhancing material;

disposing at least one layer of a second material and the first material on top of the first area using at least one ink-jet printhead, wherein the second material is a contrast enhancing material, wherein the second material is disposed onto a designated area, wherein the first material is disposed onto a second area, wherein the second area and the designated area are different areas on top of the first area, wherein the first material and the second material are not the same material;

forming a first identifiable structure from at least one layer of the second material;

disposing at least one layer of the first material on top of the second area and the designated area using at least one ink-jet printhead;

forming the first identifiable structure from the second material within the three-dimensional object, wherein the first identifiable structure within the three-dimensional object is detectable using a non-invasive dimensional imaging device, wherein the three-dimensional object is selected from: a bone replacement and a medical device disposed within a body of an individual;

disposing a third material onto a portion of the designated area, wherein the third material is a contrast enhancing material, and wherein the second material and the third material are different contrast enhancing materials; and forming a second identifiable structure embedded within the first identifiable structure using the third material, wherein the second identifiable structure within the three-dimensional object is detectable using a second non-invasive dimensional imaging device.

2. The method of claim 1, further comprising:
forming a plurality of identifiable structures within the three-dimensional object.

3. The method of claim 1, wherein the identifiable structure is fabricated from the contrast enhancing material and includes at least one air-gap within the identifiable structure, wherein the combination of the contrast enhancing material and the air-gap define structure selected from a letter, a number, a symbol, an icon, an emblem, a logo, a sign, a bar code, a reference mark, a unique shape, a pattern and combinations thereof.

4. The method of claim 1, wherein the non-invasive dimensional imaging device includes devices selected from X-ray devices, magnetic imaging devices, computerized axial tomography (CAT) scan devices, ultrasound devices, and computerized topography devices.

5. The method of claim 1, wherein the contrast enhancing material is selected from nano-particles, micro-particles, colorants, and combinations thereof.

6. The method of claim 1, wherein the identifiable structure is selected from a letter, a number, a symbol, an icon, an emblem, a logo, a sign, a bar code, a reference mark, a unique shape, a pattern and combinations thereof.

7. The method of claim 1, further comprising:
planing each layer of the first material; and
curing each layer of the first material.

8. The method of claim 7, further comprising:
planing each layer of the second material; and
curing each layer of the second material.

9. The method of claim 1, wherein the three-dimensional object is selected from a bone replacement.

* * * * *